United States Patent
Steinkellner

(12) 
(10) Patent No.: US 6,612,183 B2
(45) Date of Patent: Sep. 2, 2003

(54) METHOD FOR REGULATING THE COUNTERPRESSURE IN AN APPARATUS FOR PLASTICISING AND QUANTITATIVELY REGULATING PLASTIC MATERIAL

(75) Inventor: Wolfgang Steinkellner, Haag (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 0 days.

(21) Appl. No.: 09/940,112

(22) Filed: Aug. 27, 2001

(65) Prior Publication Data

US 2002/0066320 A1 Jun. 6, 2002

(30) Foreign Application Priority Data

Sep. 11, 2000 (AT) .......................................... 1536/2000

(51) Int. Cl.[7] .................................................. G01N 3/10
(52) U.S. Cl. ...................................... 73/825; 264/40.03
(58) Field of Search ................ 73/825, 824; 264/40.03; 425/150, 151

(56) References Cited

U.S. PATENT DOCUMENTS

| | | | | |
|---|---|---|---|---|
| 5,421,712 A | * | 6/1995 | Laing et al. | 264/40.7 |
| 5,445,773 A | * | 8/1995 | Arai | 264/40.1 |
| 5,470,218 A | * | 11/1995 | Hillman et al. | 264/40.6 |
| 5,540,577 A | * | 7/1996 | Ishikawa et al. | 264/40.5 |
| 5,869,108 A | * | 2/1999 | Hiraoka | 264/40.7 |
| 5,885,624 A | * | 3/1999 | Katsuta et al. | 425/149 |
| 6,183,235 B1 | * | 2/2001 | Taniguchi et al. | 425/139 |
| 6,334,765 B1 | * | 1/2002 | Ellinger | 425/149 |
| 6,365,075 B1 | * | 4/2002 | Kamiguchi et al. | 264/40.3 |

* cited by examiner

Primary Examiner—Hezron Williams
Assistant Examiner—Lilybett Martir
(74) Attorney, Agent, or Firm—Notaro & Michalos P.C.

(57) ABSTRACT

A method of regulating the counterpressure in an apparatus for plasticising and quantitatively regulating plastic material by means of a screw which is driven by separate servo motors for the rotary movement and the axial movement, wherein the deviation of the counterpressure from the reference value is detected by at least one sensor, the axial movement of the screw being predetermined and deviations of the pressure from the reference value being compensated by altering the rotary movement of the screw.

1 Claim, 3 Drawing Sheets

METHOD FOR REGULATING THE COUNTERPRESSURE IN AN APPARATUS FOR PLASTICISING AND QUANTITATIVELY REGULATING PLASTIC MATERIAL

FIELD AND BACKGROUND OF THE INVENTION

The invention relates to a method of regulating the counterpressure in an apparatus for plasticising and quantitatively regulating plastic material by means of a screw which is driven by separate servo motors for the rotary movement and the axial movement, wherein the deviation of the counterpressure from the reference value is detected by means of at least one sensor.

In a known method of that kind (see European patent application EP 0 230 488), regulation of the dynamic pressure is effected by varying the axial speed of the screw. As has been set forth in particular in EP 0 480 350, considerable disadvantages are involved if the screw position is not accurately defined as a function of time. More specifically, that makes it difficult to precisely measure the amount of plastic material to be injected.

In EP 0 480 350 the axial movement of the screw is effected by means of a hydraulic drive, in respect of which it is characteristic that the applied pressure is precisely known, whereas the respective position has to be determined by measurement. In that known method, it can therefore be assumed that the dynamic pressure corresponds to the predetermined value whereas the screw position has to be regulated, which is effected indirectly by way of the change in the speed of screw rotation.

SUMMARY OF THE INVENTION

The invention is based on an apparatus in which the axial movement of the screw is also produced by means of a servo motor. With a drive of that kind, it can be assumed that the precise position of the driven screw is known at any time. The current strength which occurs in the servo motor is on the other hand only a very indirect measurement in respect of the torque generated by the motor, and even more so for the dynamic pressure. The latter therefore has to be measured by way of sensors. There is therefore the possibility, in accordance with the invention, of improving a method of the kind set forth in the opening part of this specification, in that the axial movement of the screw is predetermined and deviations of the pressure from the reference value are compensated by altering the rotary movement of the screw.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
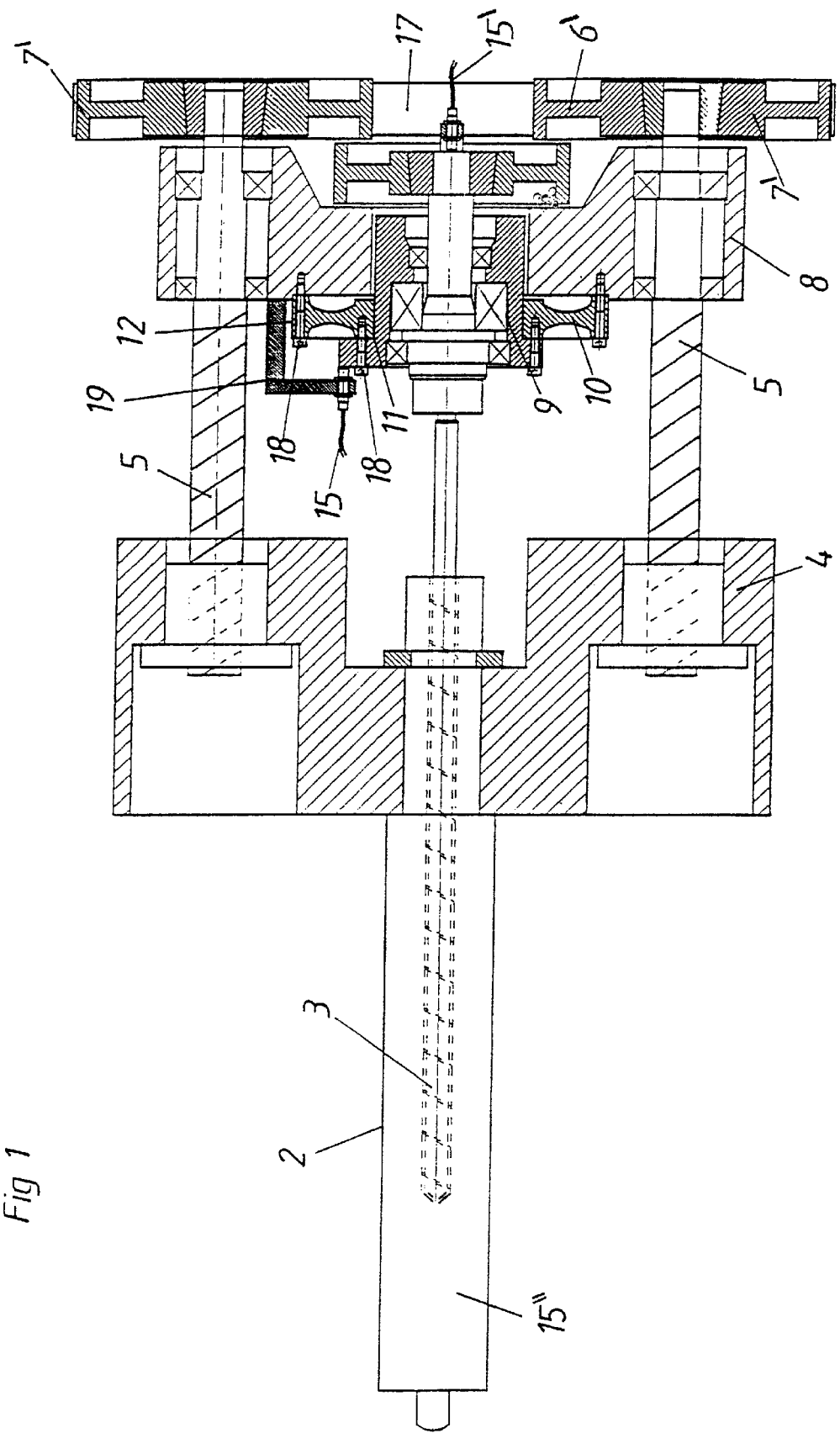
FIGS. 1 and 2 are respective horizontal and vertical sectional views of the essential parts of an injection apparatus for carrying out the method.
Figure 2:
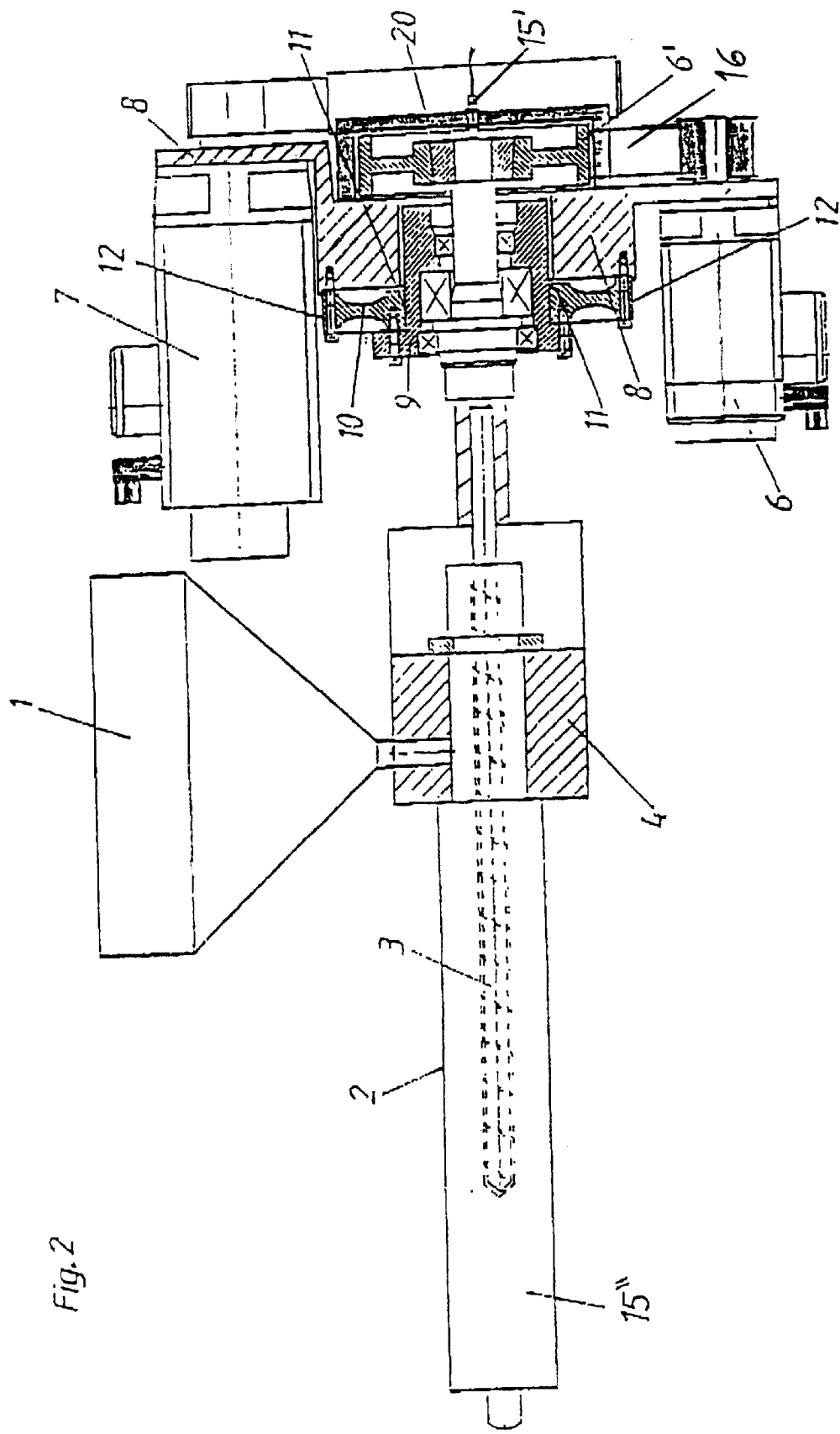

Referring now to the drawings, in which like reference numerals are used to refer to the same or similar elements, the injection apparatus shown in FIGS. 1 and 2 has a screw 3 which is mounted rotatably and longitudinal slidably in an injection cylinder 2. Plastic material fed to the screw 3 through the hopper 1 is plasticised by the rotation of the screw 3 and accumulated in the screw antechamber until it is injected into the mould cavity (not shown) by forward thrust movement of the screw 3. During the procedure of metering or quantitatively regulating and injecting the plastic material the carrier plate 4 which is connected to the injection cylinder 2 remains immobile. The end of the screw 3 is supported in a pressure plate 8 against which the screw 3 bears. The pressure plate 8 in turn is supported in the carrier plate 4 by way of spindles 5. The drive of the spindles 5 is effected by way of the V-belt 17 and the drive pulleys 7' by means of a servo motor 7 which also performs the movement of the pressure plate 8. Also connected to the pressure plate 8 is the quantitative regulating drive 6 which rotates the screw 3 and which drives the drive pulley 6' by way of the V-belt 16.

The end of the screw 3 is supported in a rotary bearing which is not of greater interest here and which is surrounded by a fixed sleeve 9. The connection between the sleeve 9 and the pressure plate 8 is afforded by way of an annular disc 10. The cross-section of the annular disc 10 approximately corresponds to that of an I-beam. Its inner edge 11 is connected to the sleeve 9 and its outer edge 12 to the pressure plate 8, by screws 18.

In the injection procedure the pressure plate 8 is moved towards the left by means of the motor 7 by way of the spindles 5, whereby a pressure is produced in the plastic material in front of the screw 3, that pressure resulting in deformation of the annular disc 10. If, on the other hand, the screw 3 is caused to rotate by the quantitatively regulating motor 6, then the plastic material which accumulates in front of the screw exerts a dynamic pressure which is kept within limits by movement of the pressure plate 8 towards the right. Once again deformation of the annular disc 10 occurs.

FIG. 1 shows two sensors 15 and 15' which are in the form of distance-measuring devices. In this case the sensor 15 inductively measures the distance between the sleeve 9 and an angle carrier member 19 fixedly connected to the plate 8. The sensor 15' in contrast is fixedly connected to the plate 8 by way of the yoke member 20 and measures the distance with respect to the drive pulley 6' which is not longitudinally displaceable with respect to the sleeve 9. The arrangement of a plurality of sensors 15, 15' is very suitable as the results thereof can be averaged.

It will be appreciated that it would also be possible to determine the dynamic pressure by means of a sensors which measures the deformation of a member which is acted upon thereby. Likewise, it is possible to measure the pressure by a sensor 15" which is acted upon by the plasticised plastic material.

Figure 3:
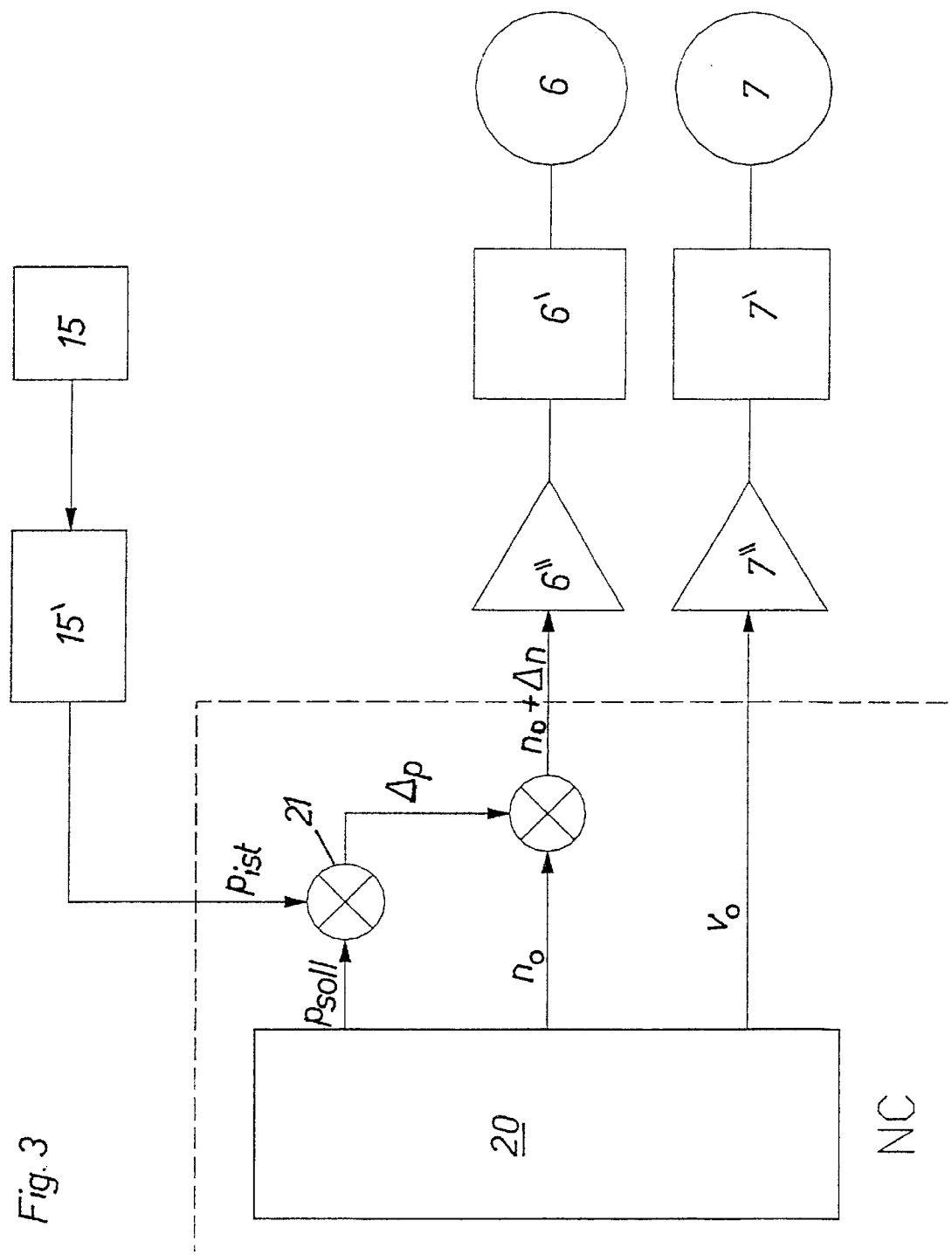
FIG. 3 is a diagrammatic view of the regulation apparatus in accordance with the invention.

The method shown in FIG. 3 is based on the assumption that the desired dynamic pressure which depends on the structure of the machine and the quality of the plastic material is predetermined by a computer 20. The computer determines a reference speed $V_o$ for the axial rearward movement of the screw in the plasticising and quantitatively regulating procedure. That value is processed by a servo regulator 7" and a power amplifier 7' and precisely implemented by the motor 7.

The value $n_o$ which is initially predetermined by the computer 20 for the rotary movement of the screw 3 is, however, variable in accordance with the invention for the purposes of regulating the dynamic pressure. The dynamic pressure $P_{1st}$ which actually prevails is determined as described by the sensor 15 and fed by the measurement amplifier 15' to the comparison circuit 21. If a deviation $\Delta p$ in relation to the value $p_{soll}$ which is predetermined by the computer 20 is detected, the regulator 22 calculates the change $\Delta n$ in the speed of screw rotation, which causes the difference $\Delta p$ to disappear. The altered rotary speed $n_o+\Delta n$ is fed by way of the sensor regulator 6" and the power amplifier 6' to the motor 6 which serves to rotate the screw.

While a specific embodiment of the invention has been shown and described in detail to illustrate the application of the principles of the invention, it will be understood that the invention may be embodied otherwise without departing from such principles.

What is claimed:

1. A method of regulating counterpressure in an apparatus for plasticising and quantitatively regulating plastic material by means of a screw which is driven by separate servo motors for rotary movement and axial movement, comprising:

assigning a reference value for the counterpressure;

assigning a reference value for the rotary movement of the screw;

detecting the momentary value of the counterpressure by at least one sensor;

comparing the momentary value of the counterpressure with the reference value of the counterpressure; and compensating for deviations of the momentary value of the counterpressure from the reference value of the counterpressure by altering the rotary movement of the screw, the axial movement of the screw being predetermined.

* * * * *